United States Patent [19]

Minozzi, Jr.

[11] 4,306,575

[45] Dec. 22, 1981

[54] SMOKE DETECTOR TESTER

[76] Inventor: Michael F. Minozzi, Jr., 10 Mein Dr., New City, N.Y. 10956

[21] Appl. No.: 63,667

[22] Filed: Aug. 6, 1979

[51] Int. Cl.[3] .......................... A24F 1/10; A01G 13/08; F04B 17/00

[52] U.S. Cl. .................................... 131/329; 126/59.5; 417/411

[58] Field of Search .................... 126/59.5; 131/171 R; 274/1 R; 417/411

[56] References Cited

U.S. PATENT DOCUMENTS

| | | | |
|---|---|---|---|
| 3,258,003 | 6/1966 | Turner | 126/59.5 |
| 3,315,966 | 4/1967 | Allen | 274/1 A |
| 3,513,823 | 5/1970 | Fessmann | 126/59.5 |
| 3,528,435 | 9/1970 | Morrissey | 131/171 R |
| 3,565,051 | 2/1971 | Swift | 126/59.5 |
| 4,193,411 | 3/1980 | Faris et al. | 131/171 R |

*Primary Examiner*—Samuel Scott
*Assistant Examiner*—Wesley S. Ratliff, Jr.
*Attorney, Agent, or Firm*—Pasquale A. Razzano

[57] ABSTRACT

A smoke detector testing device includes a housing, an impeller rotatably mounted in the housing, and means for rotating the impeller. The housing has a port opening into the housing for receiving the unlit end of a cigarette and an elongated hollow tube extending from the housing for discharging smoke therefrom when the impeller is operated thereby to project smoke to a remote location adjacent a smoke detector mounted on the ceiling of a room or the like.

5 Claims, 5 Drawing Figures

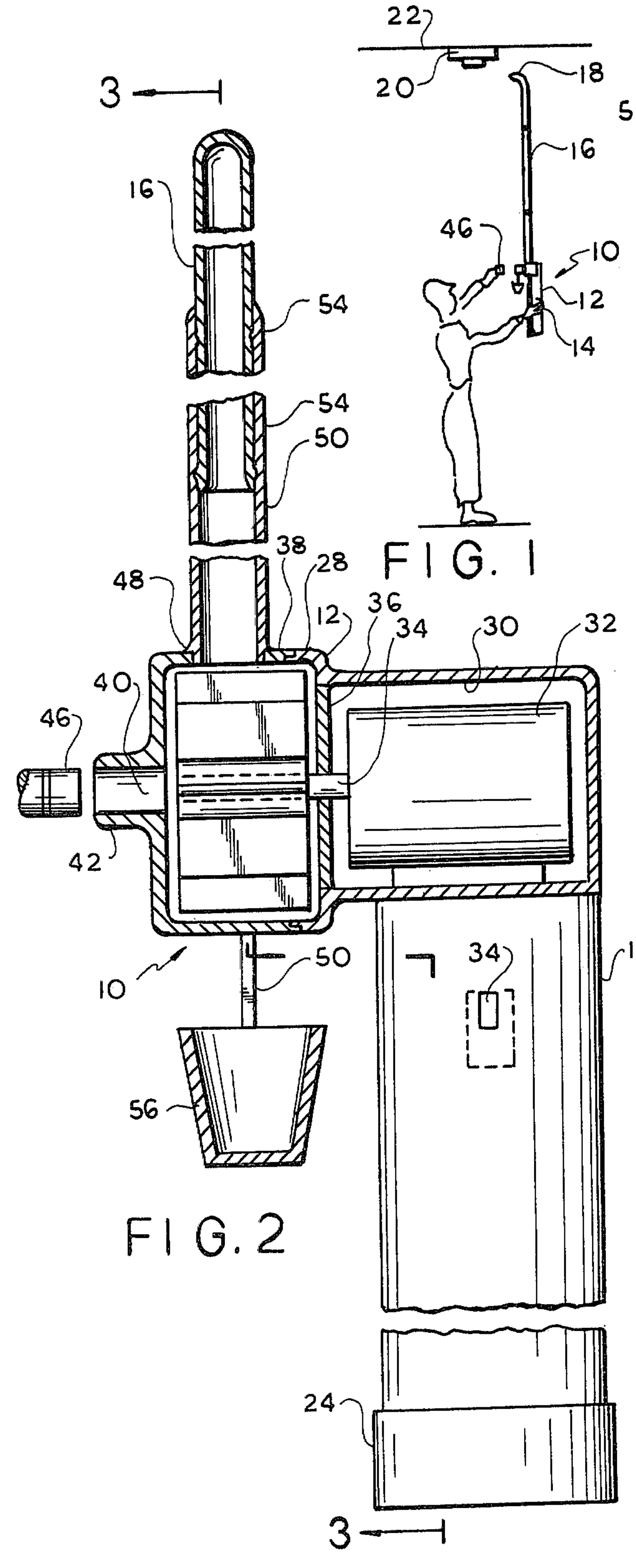
FIG. 1
FIG. 2
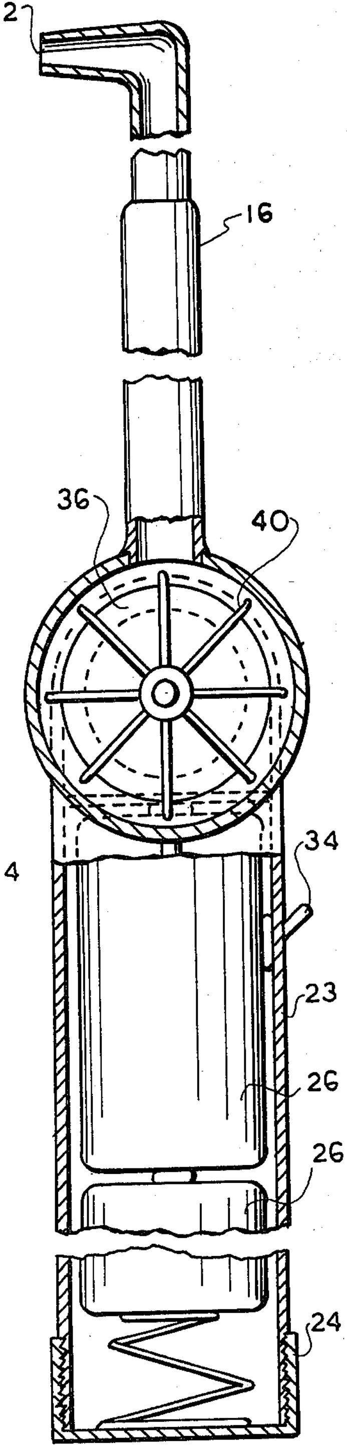
FIG. 3

SMOKE DETECTOR TESTER

The present invention relates to smoke detector testing devices and in particular to a smoke detector testing device which is useful for testing the operation of a smoke detector from a remote location.

In recent years there has been a widespread development in the art of smoke detecting units particularly adapted for use as home safety devices. Such units are well known and operate on a number of different principles, including optical detection of smoke particles and ionization principles. With all of such devices it is desirable, from time to time, for the home owner to check the operability of the device. This is particularly true with battery operated smoke detectors and those that may include elements which deteriorate over time. For this purpose, a number of proposals have been made to include built-in testing units which require the home owner to operate a switch or some other device on the detector unit itself in order to determine whether the alarm portion of the unit operates. Such devices are shown for example in U.S. Pat. Nos. 4,144,459; 4,053,785; 4,099,178. These devices have been found to be inconvenient in use because the home owner must move a ladder or chair from place to place in order to reach each smoke detector, which is usually mounted on the ceiling of a room or hallway. Because of this inconvenience, the home owner often may not follow the normal recommended testing operation at the recommended time periods. Thus it is possible that the homeowner's smoke detector will become inoperative at a critical period unbeknownst to the homeowner.

It is an object of the present invention to provide a smoke detector testing device which is convenient for a home owner to use to test a smoke detector from a remote location.

Another object of the present invention is to provide a smoke detector tester which utilizes smoke to perform the test.

A further object of the present invention is to provide a smoke detector testing unit which can be operated from a remote location.

Another object of the present invention is to provide a smoke detector testing unit which is portable and can be moved from place to place and operated without the aid of a ladder or other object upon which the user must stand.

A still further object of the present invention is to provide a smoke detector testing unit which is relatively simple in construction and operation.

Yet another object of the present invention is to provide a smoke detector testing unit which is relatively simple to manufacture and durable in use.

In accordance with an aspect of the present invention a smoke detector testing unit is provided which includes a housing having a gas chamber formed therein. A gas impeller is rotatably mounted in the gas chamber and means are provided for rotating the impeller. Such means can include, for example, an electric motor, or a second impeller in the housing which is adapted to be operated upon the operator's blowing into the housing. In either embodiment the housing has a first opening formed therein which is adapted to receive the unlit end of a cigarette or other similar object so that upon operation of the impeller in the gas chamber smoke particles from the cigarette are drawn into the gas chamber. An elongated gas discharge tube is secured to the housing in communication with the gas chamber so that upon operation of the impeller the smoke particles which are drawn into the gas chamber are projected through the tube to a remote location. This enables the operator to project the smoke particles from the end of the tube into the smoke detector unit to cause the unit to operate and enable the user to determine whether the smoke detector is in fact operable. After the test, the operator removes the cigarette from the tester unit and keeps the unit operating to blow clean air into the smoke detector, thereby to clear smoke from the detector unit and shut off the alarm.

The above, and other objects, features and advantages of the present invention will be apparent to those skilled in the art in the following detailed description of illustrative embodiments of the invention, when read in connection with the accompanying drawings, wherein:

FIG. 1 is a diagrammatic view of the smoke detector of the present invention in operation;

FIG. 2 is a plan view, partly in section, of a smoke detector tester unit constructed in accordance with the present invention;

FIG. 3 is a partial sectional view taken along line 3—3 of FIG. 2;

Figure 4:
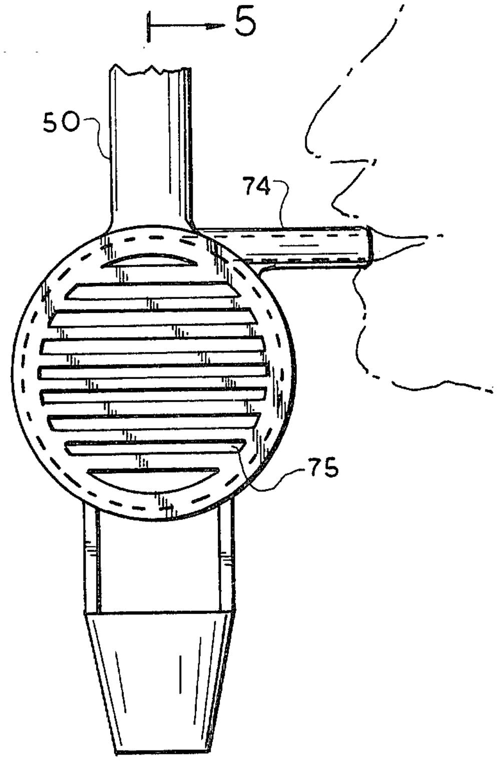
FIG. 4 is a partial side view of a smoke detector tester unit constructed in accordance with another embodiment of the present invention.

Referring now to the drawing in detail, and initially to FIG. 1 thereof, a smoke detector tester unit 10, constructed in accordance with the present invention, is shown in operation. The unit includes a housing 12 which includes a handle 14 that is adapted to be manually held by the operator. The operator inserts the unlit end of a cigarette 46 in an opening in the housing, as hereinafter described, to draw the smoke particles from the cigarette into the housing and to project them through an elongated tube 16 which is positioned by the operator so that its free open end 18 is located adjacent a smoke detector unit 20 secured, in the conventional manner, on the ceiling 22 of a room or the like.

Smoke detector 20 may be of any known conventional construction, such as is presently available. By projecting smoke from the testor unit 10 through the tube 16 to the smoke detector 20, the operator causes the unit to be activated, if it is in fact operable. If the detector does not produce the desired signal, representing detection of smoke particles, the operator knows that the detector has malfunctioned, e.g. its batteries are dead or some other portion of the unit has deteriorated. With this arrangement, the operator can conveniently test all the smoke detector units in his home, without the use of a ladder or other object upon which he must stand to manually operate or test the unit on the ceiling itself.

The smoke detector testor 10 of the present invention is illustrated in greater detail in FIGS. 2 and 3. As seen therein the unit includes a multipart housing 12 which includes the handle 14. The latter is a generally cylindrical member which defines a battery chamber 23 similar to that used on flashlight casings. The lower end of the handle includes a removable cap 24 which permits access to the interior of the handle for insertion and removal of batteries 26.

Housing 12 is formed to define a gas chamber 28, and a separate or second chamber 30. The latter includes an electric motor 32 electrically connected to batteries 26 and a manually operable switch 34, in any convenient manner, so that actuation of switch 34 will actuate motor 32.

Motor 32 includes an output shaft 34 that extends through a partition wall 36 in housing 12 into gas chamber 28. A gas impeller 38, having a plurality of vanes 40 integrally formed therewith is mounted on the end of motor shaft 34 in gas chamber 28. The impeller is of any conventional construction, preferably formed of an elastomeric material so that vanes 38 are relatively flexible.

The portion of the housing 12 which defines gas chamber 28 has an inlet port 40 formed therein. A collar 42, integrally formed with the housing, extends from port 40 and is dimensioned to receive the unlit end 46 of a cigarette 46, or the lit end of another burning object, such as for example a so-called "punk". With this arrangement, operation of motor 32 will cause the impeller to create a vacuum in the center of chamber 28 and draw smoke from the end of the cigarette into the gas chamber. Thus the operator is not required to actually draw on or "smoke" the cigarette.

The smoke drawn from the cigarette is discharged by the impeller vanes 38 through a discharge opening 48 in the periphery of housing 12. To aid in directing the smoke towards the smoke detector unit 20, an elongated tube 50 is secured in the port opening 48 in any convenient manner, such as for example by the friction fit illustrated in FIG. 2.

Elongated tube 50 is hollow and has a free end 52 which may be shaped in the form of a nozzle. The tube itself may be a one-piece elongated member formed of a flexible plastic material, reinforced by a rigid member (not shown) or alternatively, it may be formed of relatively rigid materials as a telescopic member, such as illustrated in FIG. 2. The telescopic tube can be formed in any convenient manner, such as for example in the manner of conventional radio antenna construction, with the facing surfaces of the telescoping tube sections having abutment members 54 formed thereon to limit the amount of extension and prevent separation of the telescopic components.

Housing 12 is also provided with a cuplike receptacle member 56 removably secured thereto in any convenient manner by integral mounting arms 58 or the like, which may be snap fit in recesses (not shown) in the housing. The receptacle provides a depository for ashes from the cigarette during use of the device.

With this construction of the invention, a portable unit is provided which is readily transported by the operator from smoke detector unit to smoke detector unit to provide a quick test of the smoke detectors. In operation the unlit end of a cigarette 16 is inserted in collar 42, which is dimensioned to support the cigarette. Operation of the impeller draws smoke from the cigarette into the gas chamber 28 and discharges it through tube 50 so that it will be projected from nozzle end 52 into the smoke detector unit.

Figure 5:
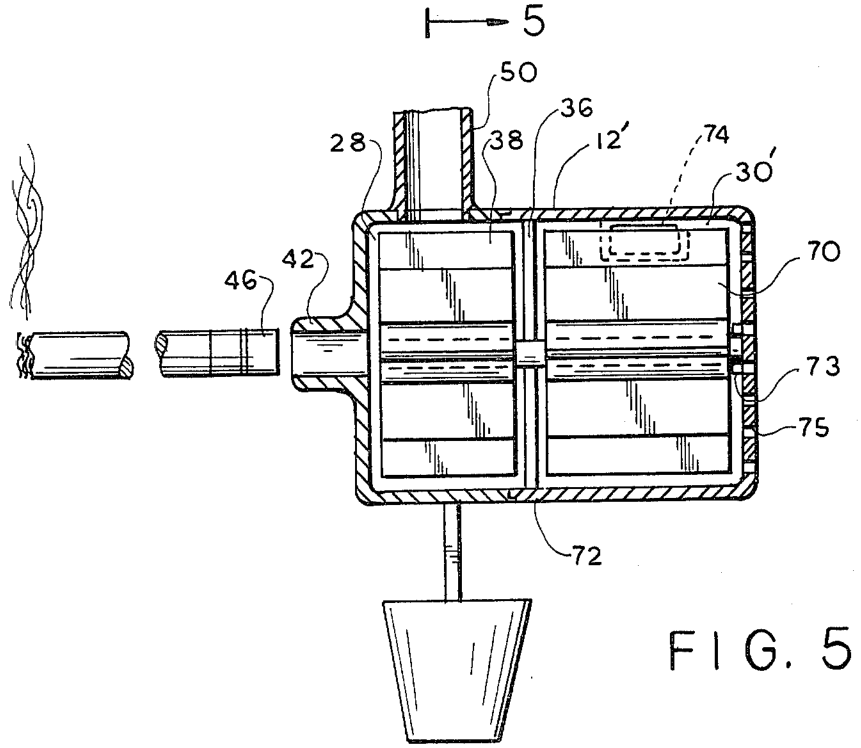
FIG. 5 is a sectional view taken along line 5—5 of FIG. 4.

Another embodiment of the invention is illustrated in FIGS. 4 and 5 which show a smoke detector tester of similar construction to that of the embodiment of FIG. 1, but without a motor. In this embodiment the housing 12′ has a separator wall 36 formed therein which divides the housing in the gas chamber 28 and the second chamber 30′. A shaft 72 is rotatably mounted in wall 36 with one end thereof received in a bushing 73 formed in one end wall of the housing. The main gas impeller 38 is fixed to shaft 72 for rotation therewith.

A second impeller 70 is fixed to shaft 72 and defines the drive means for impeller 38. A mouthpiece 74 is formed in housing 74 in communication with chamber 30′ so that the operator may blow into chamber 30′. This will cause impeller 70, shaft 72 and, thus, impeller 38 to rotate. Housing 12 has openings 75 formed in one wall in communication with chamber 30 to allow escape of any blown smoke into the chamber.

In this embodiment housing 12 includes collar 42, as in the prior embodiment, so that the unlit end of cigarette 16 can be supported therein. Thus, rotation of impeller 38 will draw smoke into chamber 28 and discharge it through tube 50 for use in testing operation of a smoke detector unit.

This embodiment of the invention is relatively simple in construction and eliminates the need for batteries and an expensive electric motor. Thus the entire device is economical to manufacture and sell and is always available for use in testing a smoke detector unit.

Although illustrative embodiments of the present invention have been described herein with reference to the accompanying drawings, it is to be understood that the invention is not limited to these precise embodiments but that various changes and modifications may be effected therein by those skilled in the art without departing from the scope or spirit of this invention.

What is claimed is:

1. A smoke detector tester comprising a housing, an impeller rotatably mounted in said housing, and means for rotating said impeller, said housing having a port opening formed therein for receiving an end of a burning object and an elongated hollow tube extending from the housing for discharging smoke therethrough from said object; said housing including a pair of separate impeller chambers formed therein with said impeller being mounted on one of said chambers, said means for rotating said impeller including a second impeller rotatably mounted in the other impeller chamber and drivingly engaged with the first mentioned impeller, said housing including an apertured mouthpiece, separate from said port opening and said hollow tube located in communication with said other chamber whereby a person may blow into the mouthpiece to rotate said second impeller and thereby drive said first impeller to draw smoke from the burning object through the port into said one chamber and out through said elongated hollow tube.

2. A smoke detector tester as defined in claim 1 wherein said housing port includes a collar adapted to receive and support the unlit end of a cigarette.

3. A smoke detector tester as defined in claim 1 including a receptacle mounted on said housing for receiving ashes.

4. A smoke detector tester comprising, a housing having a gas chamber formed therein, a gas impeller rotatably mounted in said housing in said gas chamber, means for rotating said impeller, said housing having a first opening formed therein for receiving an end of a cigarette or the like and a second gas discharge opening therein, and an elongated gas discharge tube secured to said housing in communication with said gas discharge opening whereby, upon operation of said impeller by said rotating means, gas particles are drawn into said chamber from said cigarette and projected through said tube to a remote location; said housing including a second chamber separate from and coaxial with said gas chamber, said impeller having an elongated shaft extending from said gas chamber into said second chamber, said means for rotating said impeller comprising a second impeller in said second chamber secured to said shaft, said housing including an apertured mouthpiece formed thereon separate from said first opening and tube in communication with said second chamber whereby a person may blow into said mouthpiece to rotate the second impeller and drive the impeller in the gas chamber to draw smoke particles into the gas chamber and discharge them through said tube.

5. A smoke detector tester as defined in claim 4 wherein said tube is a telescopic member.

* * * * *